(12) United States Patent
Chen et al.

(10) Patent No.: US 11,080,050 B2
(45) Date of Patent: Aug. 3, 2021

(54) CLASS DATA LOADING ACCELERATION

(71) Applicant: INTERNATIONAL BUSINESS MACHINES CORPORATION, Armonk, NY (US)

(72) Inventors: Qin Yue Chen, Shanghai (CN); Yong Xin Qi, Beijing (CN); Qi Liang, Shanghai (CN); Shuai Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 16/260,168

(22) Filed: Jan. 29, 2019

(65) Prior Publication Data
US 2020/0241875 A1    Jul. 30, 2020

(51) Int. Cl.
*G06F 9/30* (2018.01)
*G06F 9/54* (2006.01)
*G06F 9/50* (2006.01)
*G06F 16/58* (2019.01)

(52) U.S. Cl.
CPC .......... *G06F 9/30043* (2013.01); *G06F 9/50* (2013.01); *G06F 9/544* (2013.01); *G06F 16/58* (2019.01); *G06F 2209/5011* (2013.01)

(58) Field of Classification Search
CPC ........ G06F 9/30043; G06F 16/58; G06F 9/50; G06F 9/544
USPC ........................................................ 718/104
See application file for complete search history.

(56) References Cited

U.S. PATENT DOCUMENTS

| 7,814,472 | B2 | 10/2010 | Atsatt |
| 7,865,871 | B2* | 1/2011 | Maron .................... G06F 8/315 717/108 |
| 7,954,096 | B2 | 5/2011 | Atsatt |
| 9,250,891 | B1 | 2/2016 | Beranek et al. |
| 9,471,353 | B1 | 10/2016 | Christopher et al. |
| 9,823,915 | B1* | 11/2017 | Maloney .................. G06F 8/61 |
| 2014/0053150 | A1* | 2/2014 | Barnett ............... G06F 9/45558 718/1 |
| 2015/0317167 | A1 | 11/2015 | Zhou et al. |
| 2018/0157536 | A1* | 6/2018 | Jiang ....................... H04L 67/10 |

(Continued)

FOREIGN PATENT DOCUMENTS

CN    104714812 A    6/2015

OTHER PUBLICATIONS

Guniguntala, "Announcement: IBM® SDK, Java™ Technology Edition now on Docket Hub", IBM Java Technology Community, May 29, 2016, 4 pages.

(Continued)

*Primary Examiner* — John Q Chavis
(74) *Attorney, Agent, or Firm* — Teddi E. Maranzano

(57) ABSTRACT

A method, computer system, and computer program product for accelerating class data loading in a containers environment are provided. In response to a first container in a containers environment being created from a first image, at least one archive file containing a set of classes from the first image can be loaded. Then a respective class sharing file for each of the at least one archive file can be generated. The class sharing file is stored in a shared location. A second container in the containers environment is created from a second image. If a class sharing file from the archive is found in the shared location, that class sharing file can be used.

20 Claims, 8 Drawing Sheets

(56) References Cited

U.S. PATENT DOCUMENTS

2018/0373551 A1* 12/2018 Christensen ............ G06F 9/455
2020/0142801 A1* 5/2020 Huang ................ G06F 9/45558

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

CLASS DATA LOADING ACCELERATION

BACKGROUND

The present invention relates to network service environment, and more specifically, to acceleration of class data loading in containers environment.

In software development, containers are usually used to isolate different workloads (such as Java runtime environments) running in a host. In a containers environment, one container typically is created from an image comprising one or more layers. A layer of an image may contain one or more archive files each containing a set of classes. In order to create a container from an image, the archive files containing class data information may need to be loaded from the image and a class sharing file may be generated for each container. For example, the archive files may be loaded to a programming language runtime environment, and at least some of the loaded data (e.g., class metadata, static variables, strings, etc.) may be dumped into the class sharing file.

SUMMARY

Disclosed herein are embodiments of a method, computer system and computer program product for accelerating class data loading in containers environment.

According to one embodiment of the present invention, there is provided a computer-implemented method for accelerating class data loading in a containers environment. In the method, in response to a first container in a containers environment being created from a first image, at least one archive file containing a set of classes from the first image can be loaded. Then a respective class sharing file for each of the at least one archive file can be generated. The class sharing file is stored in a shared location. In response to a second container in the containers environment being created from a second image, a determination is made whether the corresponding class sharing file that is to be loaded from the second image to the second container is found in the shared location. The corresponding class sharing file can be used.

According to another embodiment, there is provided a computer system for accelerating class data loading in a containers environment. The computer system comprises one or more processors and computer-readable memory coupled to the one or more processors. The computer-readable memory includes instructions that when executed by the one or more processors perform actions of the above method.

According to a further embodiment, there is provided a computer program product for accelerating class data loading in a containers environment. The computer program product comprises a computer readable storage medium having program instructions embodied therewith. The program instructions are executable by one or more processors to cause the one or more processors to perform actions of the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
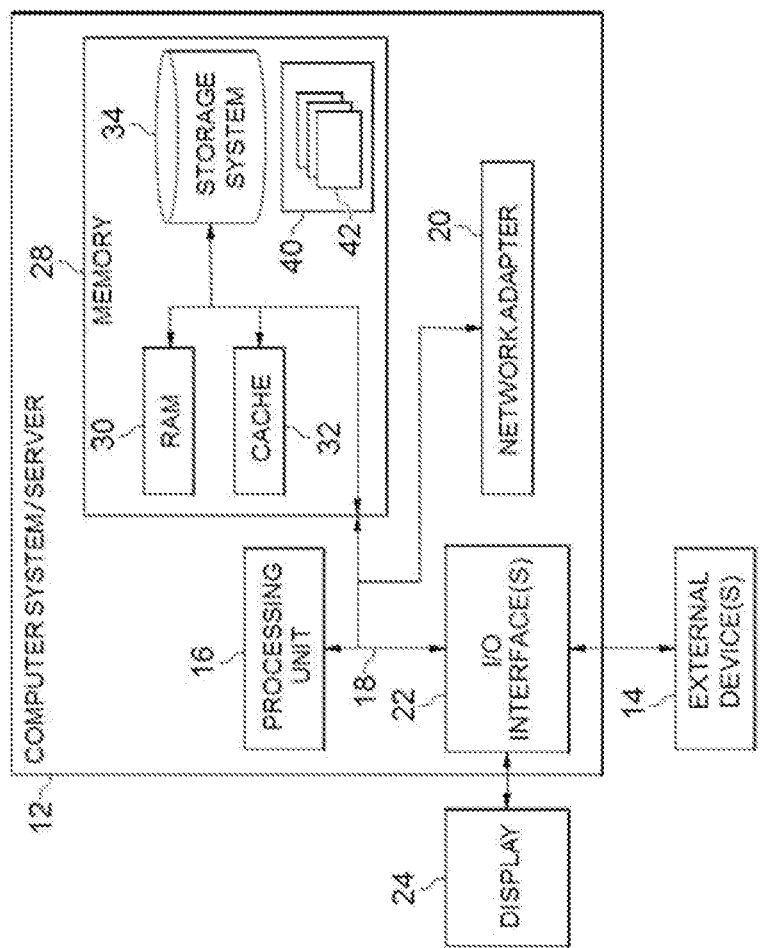
FIG. 1 depicts a cloud computing node according to an embodiment of the present invention.

Embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other computer system environments or configurations. Examples of well-known computer systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 is shown as a cloud computing node 10. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
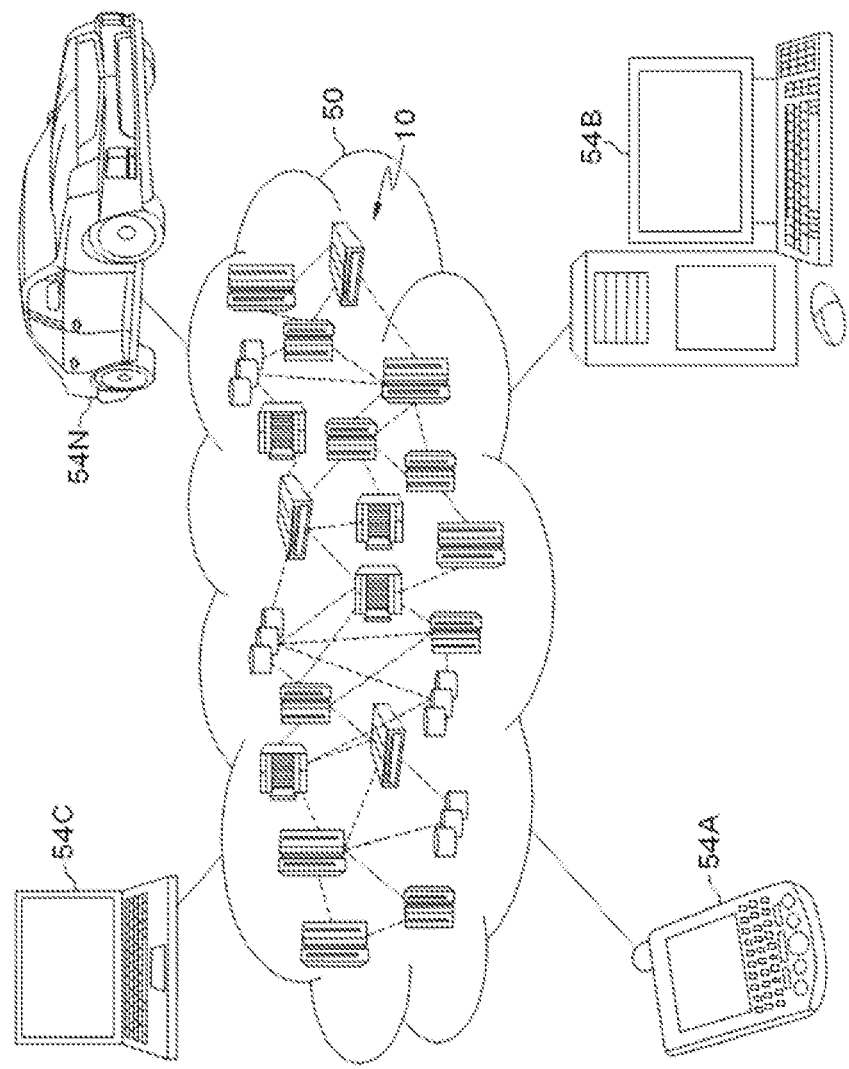
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
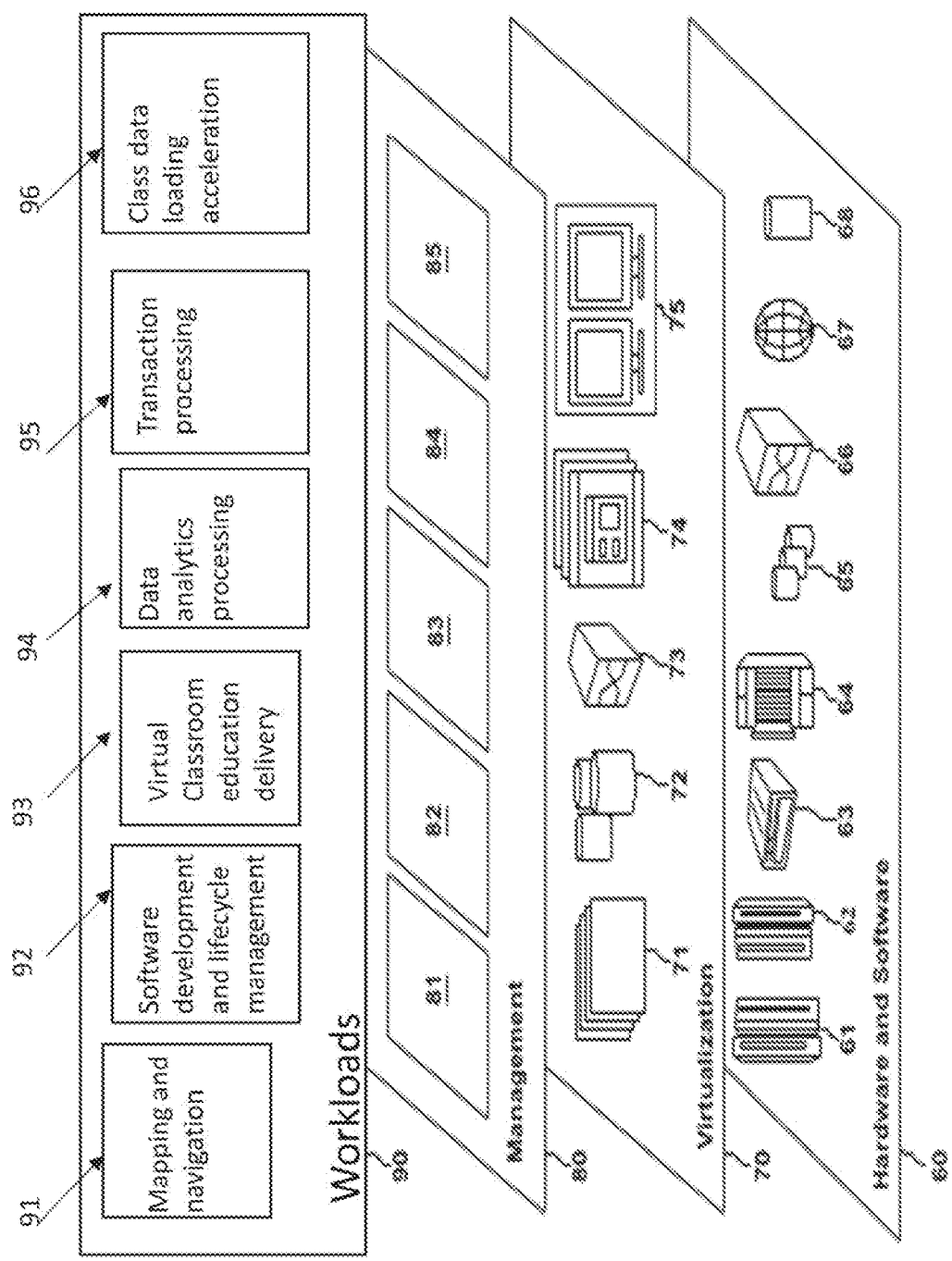
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class data loading acceleration 96.

To enable class data sharing between Java Virtual Machines (JVM) that are running in different containers on the same host, a storage location is designated which is shared among the containers. Currently, a class sharing file generated for a container may be shared among multiple containers. However, the class sharing file may frequently become corrupted due to multiple versions of images. For example, if Java Archive (Jar) file in one container is updated, the results of another container that is sharing the Jar are unpredictable, because the checksums of the updated Jar do not match the version that is still using the previous version. As a result, the class sharing file may need to be rebuilt if an archive file in one container is updated. Other containers sharing the class sharing file may have to re-load archive files from disk. The cost of re-loading the archive files can be viewed as a performance penalty because loading archive files from disk is more time-consuming than loading from the class sharing files. In addition, maintaining independent class sharing repositories for different versions of an image may increase loading time and waste memory.

Therefore, there is a need for accelerating class data loading in a containers environment.

Figure 4:
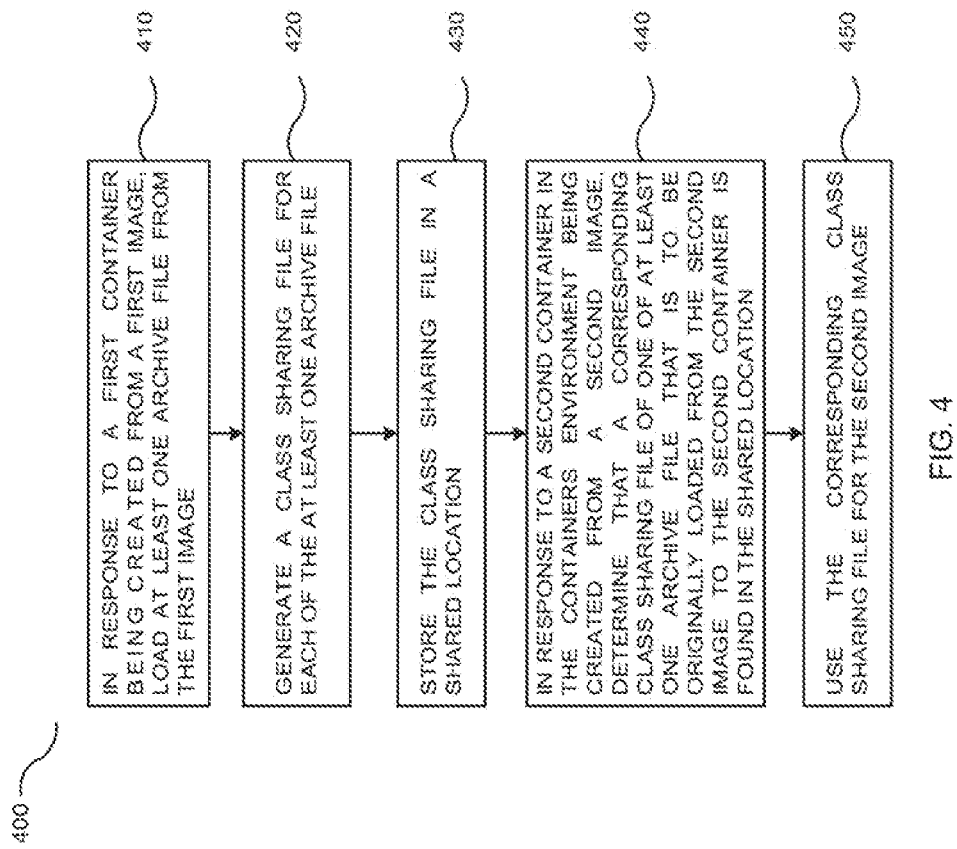
FIG. 4 is a flowchart illustrating an exemplary method for accelerating class data loading in a containers environment according to an embodiment of the present invention.

FIG. 4 is a flowchart illustrating an exemplary method 400 for accelerating class data loading in a containers environment. It would be appreciated that the method 400 can be implemented in various architectures, such as the computer system/server 12 in FIG. 1, or the cloud computing environment 50 in FIG. 2. Additionally, embodiments are described in terms of only two containers to aid in understanding various details of the embodiments. However, more than two containers can be included in the environment.

At block 410, in response to a first container in the containers environment being created from a first image, at least one archive file can be loaded from the first image. The first image can include one or more layers, and each layer can include one or more archive files containing a set of classes, such as a Jar file. The Jar file is a package file to store Java class files. When class files are parsed and loaded to JVM memory, these classes are stored in JVM memory as JVM internal representation.

The first image may include one or more layers, which are stacked on each other. When the first container is created from the first image, a new writable layer may be added on top of an underlying layer of the first image. All changes made to the first container may be written to the writable layer. An archive file in an upper layer of an image may override the same archive file in a lower layer of the image. That is to say, if an archive file (e.g., a Jar) may be found in multiple layers of an image, the archive file in the highest layer of the multiple layers containing the archive file is valid, and the same archive files in the other layers are invalid. The archive files loaded from the first image may be valid for the first image, and invalid archive files may not be loaded from the first image.

At block 420, for each of the archive files loaded from the first image, a respective class sharing file is generated, and at block 430, the class sharing file is stored in a shared location that all the containers can access. One kind of class sharing file for a Jar file is a Class Data Sharing (CDS) file which is dumped by a JVM from classes in-memory. The shared location can be accessed by multiple containers including the first container. For example, the shared location can be an area in a memory, a cache or a disk. The class sharing file may be stored as a memory-mapped file. A memory-mapped file contains the contents of a file in virtual memory, and the mapping between a file and memory space enables an application (including multiple processes) to modify the file by reading and writing directly to the memory. A memory-mapped file itself may be stored on a disk. The memory-mapped file is stored on a memory page basis. By storing the class sharing file as a memory-mapped file, the speed of loading the class sharing file may be increased and the memory footprint may be decreased.

At block 440, in response to a second container in the containers environment being created from a second image, a search of the shared location is performed to determine whether the required class sharing file is already loaded. If so, at block 450 the existing class sharing file from the shared location can be used directly instead of generating a new class sharing file from a Jar file in the second image. Additionally, if two same archive files are both valid and in the same layer of the first image and the second image, the class sharing file generated for the archive file in the first image may be used for the second image instead of loading the archive file from the second image. This can accelerate loading of the class data in the archive file of the second image by avoiding unnecessary file initialization and load operations to the shared location.

More details about method 400 will be illustrated in connection with FIGS. 5-8. It should be noted that, the method of the invention may be applicable to various programming languages (for example, object-oriented programming languages such as Java, C++, etc.), although Java is used in the following exemplary embodiments described herein.

Figure 5:
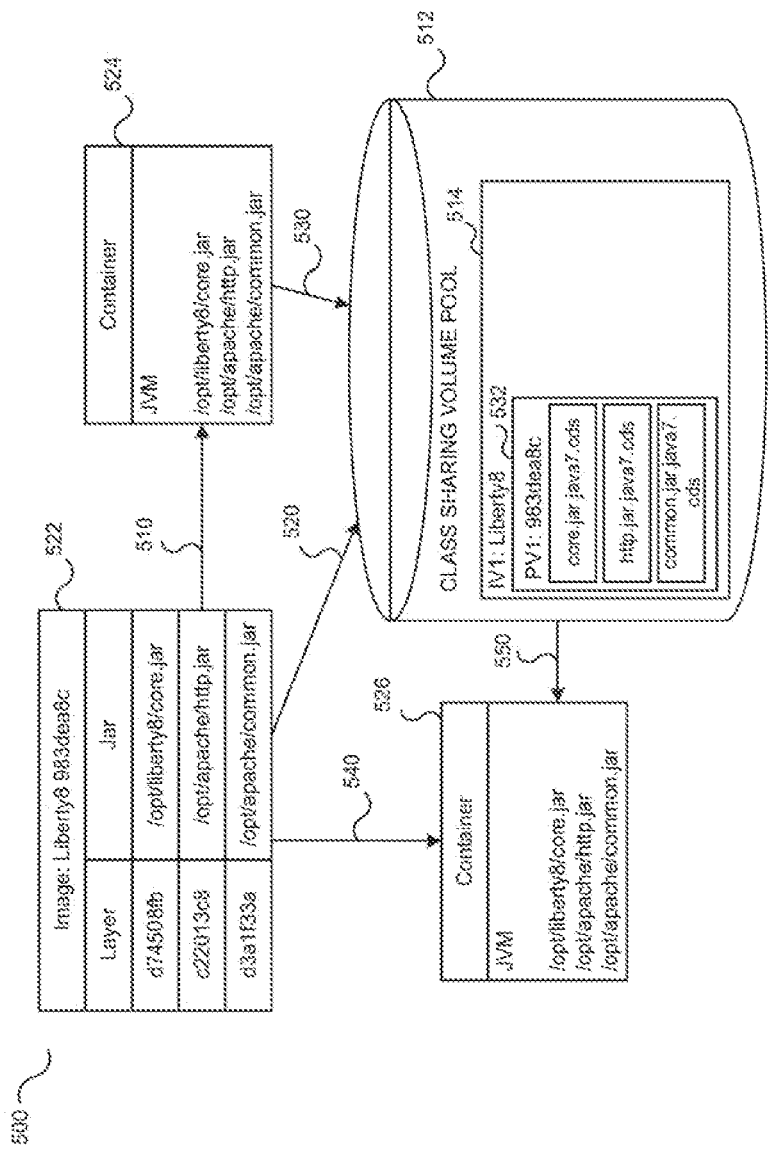
FIG. 5 is a schematic diagram illustrating an exemplary method for accelerating class data loading in a containers environment according to an embodiment of the present invention.

FIG. 5 is a schematic diagram illustrating an exemplary method for accelerating class data loading in a containers environment.

With reference to FIG. 5, in this example, shows three layers in an image 522, which is named "Liberty8" and has a version number of "983dea8c" (which is also referred to as its image ID). Layer d74508fb comprises an archive file named "/opt/liberty8/core.jar", layer c22013c8 comprises an archive file named "/opt/apache/http.jar", and layer d3a1f33a comprises an archive file named "/opt/apache/common.jar". It should be noted that, although FIG. 5 shows one archive file in each layer for simplicity, the invention is not limited thereto.

As shown by 510, container 524 is created from the image 522, and three archive files, "/opt/liberty8/core.jar", "/opt/apache/http.jar", and "/opt/apache/common.jar", by loading them from the image 522. In response to the container 524 being created, an image volume 514 named "Liberty8" is generated in a class sharing volume pool 512, and a physical volume 532 named "983dea8c" is generated in the image volume 514. The class sharing volume pool 512 is a storage location that is shared among the containers and that is designated to store class sharing files. The shared location may be an area in a memory, a cache or a disk.

As shown by 530, three class sharing files, "core.jar.java7.cds", "http.jar.java7.cds" and "common.jar.java7.cds", are generated for the three archive files ("/opt/liberty8/core.jar", "/opt/apache/http.jar", and "/opt/apache/common.jar"), respectively. The ".cds" file type is an example of a class sharing file, and the class sharing files may have any other appropriate suffixes in other instances. The archive files may be loaded to a programming language runtime environment, and at least some of the loaded data (e.g., class metadata, static variables, strings, etc.) are dumped into the CDS class sharing files. It would be appreciated that any appropriate data structures may be used to store class sharing files, including but not limited to, directories, trees, or the like.

As shown in 540, container 526 is created from the image 522. In response to the container 526 being created from the image 522, as shown in 550, the class sharing files "core.jar.java7.cds", "http.jar.java7.cds" and "common.jar.java7.cds" can be used directly from the physical volume 532. These class sharing files correspond to the three archive files, "/opt/liberty8/core.jar", "/opt/apache/http.jar", and "/opt/apache/common.jar", loaded from the image 522. Since loading class sharing files from the class sharing volume pool 512 may be quicker than loading archive files from the image 522, the creating process of the container 526 may be accelerated, thereby improving performance.

Figure 6:
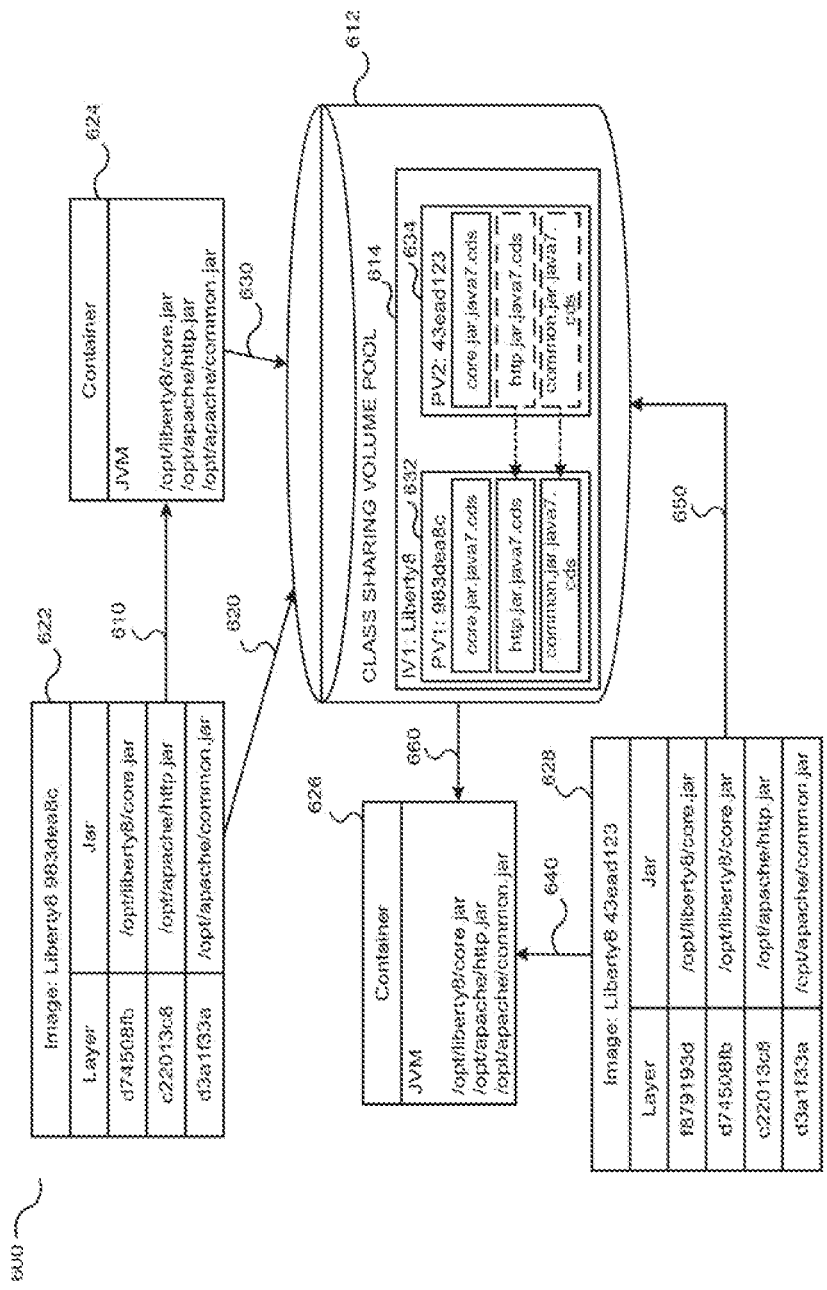
FIG. 6 is a schematic diagram illustrating an exemplary method for accelerating class data loading in a containers environment according to an embodiment of the present invention.

FIG. 6 is a schematic diagram illustrating an exemplary method for accelerating class data loading in a containers environment.

With reference to FIG. 6, this example shows three layers in an image 622, which is named "Liberty8" and has a version number of "983dea8c". Layer d74508fb comprises an archive file named "/opt/liberty8/core.jar", layer c22013c8 comprises an archive file named "/opt/apache/http.jar", and layer d3a1f33a comprises an archive file named "/opt/apache/common.jar". These are similar to the archive files of image 522 in FIG. 5. It should be noted that, although FIG. 6 shows one archive file in each layer for simplicity, the invention is not limited thereto. The image 622 can include any other appropriate number of layers and there can be more than one archive file in a single layer.

As shown by 610, container 624 is created from the image 622, and the three archive files, "/opt/liberty8/core.jar", "/opt/apache/http.jar", and "/opt/apache/common.jar". In response to the container 624 being created from the image 622, as shown in 620, an image volume 614 named "Liberty8" is created in a class sharing volume pool 612 and a physical volume 632 named "983dea8c" is created in the image volume 614.

As shown by 630, three class sharing files, "core.jar.java7.cds", "http.jar.java7.cds" and "common.jar.java7.cds", are generated for the three archive files ("/opt/liberty8/core.jar", "/opt/apache/http.jar", and "/opt/apache/common.jar"), respectively. The three class sharing files may be stored in the physical volume 632, which are located in the image volume 614. It would be appreciated that any appropriate data structures can used to store class sharing files, including but not limited to, directories, trees, or the like.

As shown by 640, container 626 is created from an image 628. The image 628 is also named "Liberty8" but has a different version number of "43ead123". As shown in FIG. 6, compared with the image 622, an archive file "/opt/liberty8/core.jar" in the image 628 is modified. For example, in a container created from the image 622, a new writable layer "f879193d" is added and the changes made to the archive file "/opt/liberty8/core.jar" in layer d74508fb are written in the new writable layer "f879193d". In this example, the image 628 is created based on the container in which the archive file "/opt/liberty8/core.jar" has been modified. That is to say, the images 622 and 628 are different versions of the same image "Liberty8". As discussed previously, an archive file in an upper layer of an image may override the same archive file in a lower layer of the image. In this case, the archive file "/opt/liberty8/core.jar" in layer f879193d may override the archive file "/opt/liberty8/core.jar" in layer d74508fb. Accordingly, the archive file "/opt/liberty8/core.jar" in layer f879193d may be valid for the image 628 and need to be loaded for the container 626, while that in layer d74508fb may be invalid for the image 628 and does not need to be loaded for the container 626.

As shown by 650, a physical volume 634 named "43ead123" is created in the image volume 614 for the image 628. Three class sharing files are stored in the physical volume 634, "core.jar.java7.cds", "http.jar.java7.cds" and "common.jar.java7.cds". These correspond to the three valid archive files in the image 628, "/opt/liberty8/core.jar" in layer f879193d, "/opt/apache/http.jar", and "/opt/apache/common.jar", respectively. The class sharing files "http.jar.java7.cds" and "common.jar.java7.cds" in the physical volume 634 may be links to the corresponding class sharing file stored in the physical volume 632 for the image 622. These include hard links, symbolic links, or any other appropriate data structures that can be used to reference a file. By storing links referencing an actual class sharing file rather than storing the class sharing file itself, storage usage of the class sharing volume pool 612 can be decreased. As "/opt/liberty8/core.jar" are in different layers in the images 622 and 628, the class sharing file "core.jar.java7.cds" stored in the physical volume 634 is generated by loading "/opt/liberty8/core.jar" in layer f879193d from the image 628.

In response to the container 626 being created from the image 628, as shown by 660, two class sharing files "http.jar.java7.cds" and "common.jar.java7.cds" are used from the physical volume 632, which correspond to the two archive files, "/opt/apache/http.jar", and "/opt/apache/common.jar". These are originally loaded from the image 628. As loading class sharing files from the class sharing volume pool 612 may be much quicker than loading archive files from the image 628, the creating process of the container 626 may be accelerated, thereby improving performance.

Using the class sharing files "http.jar.java7.cds" and "common.jar.java7.cds" from the physical volume 632 as shown in 660 can be based on a determination that corresponding class sharing files for "/opt/apache/http.jar" and "/opt/apache/common.jar" in the image 628 are found in the class sharing volume pool 612. For a first archive file (e.g., /opt/apache/common.jar) in the image 628, its corresponding class sharing file may be the class sharing file (e.g., common.jar.java7.cds) generated for the same second archive file (e.g., /opt/apache/common.jar) in the image 622, which is in the same layer (e.g., d3a1f33a) with the first archive file. If a corresponding class sharing file is not found in the class sharing volume pool 612 for an archive file in an image (e.g., /opt/liberty8/core.jar in layer f879193d in the image 628, as /opt/liberty8/core.jar in the image 622 is in a different layer d74508fb), the archive file can be loaded from the image. By creating class sharing files for each different archive file rather than for a whole container, the class sharing files can be shared across images, and the class sharing file failure penalty can be avoided and memory footprint can be decreased.

Figure 7:
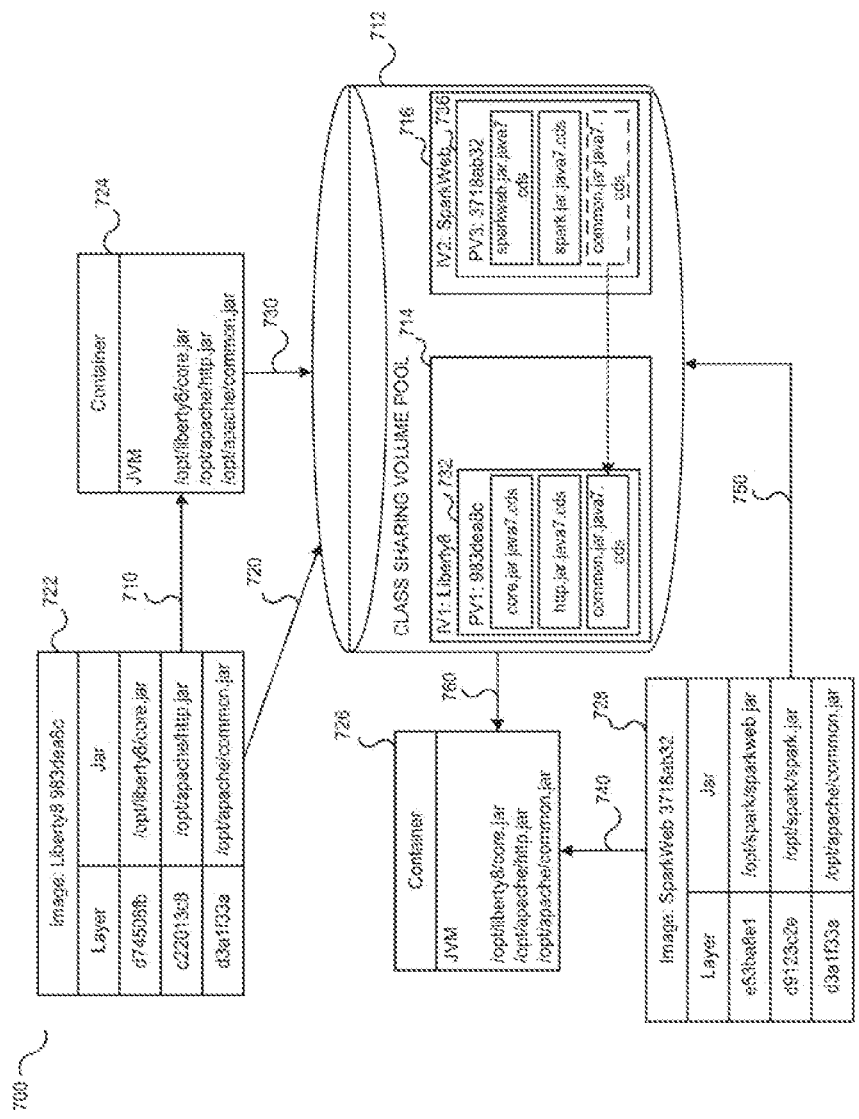
FIG. 7 is a schematic diagram illustrating an exemplary method for accelerating class data loading in a containers environment according to an embodiment of the present invention.

FIG. 7 is a schematic diagram illustrating an exemplary method for accelerating class data loading in a containers environment.

With reference to FIG. 7, in this example, there are three layers in an image 722, which is named "Liberty8" and has a version number of "983dea8c". Layer d74508fb comprises an archive file named "/opt/liberty8/core.jar", layer c22013c8 comprises an archive file named "/opt/apache/http.jar", and layer d3a1f33a comprises an archive file named "/opt/apache/common.jar", which is similar with image 522 in FIG. 5 and image 622 in FIG. 6. It should be noted that, although FIG. 7 shows one archive file in each layer for simplicity, the invention is not limited thereto. The image 722 can include any other appropriate number of layers and there can be more than one archive file in a single layer.

As shown by 710, container 724 is created from the image 722, and three archive files, "/opt/liberty8/core.jar", "/opt/apache/http.jar", and "/opt/apache/common.jar". In response to the container 724 being created from the image 722, as shown by 720, an image volume 714 named "Liberty8" is created in a class sharing volume pool 712 and a physical volume 732 named "983dea8c" is created in the image volume 714.

As shown by 730, three class sharing files, "core.jar.java7.cds", "http.jar.java7.cds" and "common.jar.java7.cds", are generated for the three archive files ("/opt/liberty8/core.jar", "/opt/apache/http.jar", and "/opt/apache/common.jar"), respectively. The three class sharing files are stored in the physical volume 732, which is located in the image volume 714.

As shown by 740, container 726 is created from an image 728. The image 728 is named "SparkWeb" and has a version number of "3718ab32". The images 722 and 728 are different images since their names are not the same. As shown in FIG. 7, there is only one common archive file "/opt/apache/common.jar" between the images 722 and 728. It would be appreciated that there may be one or more invalid archive files in the image 728, and FIG. 7 only shows the valid archive files for clarity.

As shown by 750, an image volume 716 named "Spark-Web" is created in the class sharing volume pool 712. A physical volume 736 named "3718ab32" is created in the image volume 716 for the image 728. Three class sharing files are stored in the physical volume 736, that is, "sparkweb.jar.java7.cds", "spark.jar.java7.cds" and "common.jar.java7.cds", which correspond to the three valid archive files in the image 728, "/opt/spark/sparkweb.jar", "/opt/spark/spark.jar", and "/opt/apache/common.jar", respectively. The class sharing file "common.jar.java7.cds" can be linked to the corresponding class sharing file stored in the physical volume 732 for the image 722, such as a hard link, symbolic link, or any other appropriate data structure that can be used to reference a file. By storing a link referencing an actual class sharing file rather than storing the class sharing file itself, storage usage of the class sharing volume pool 712 can be decreased. The class sharing files "sparkweb.jar.java7.cds" and "spark.jar.java7.cds" stored in the physical volume 736 are generated by loading "/opt/spark/sparkweb.jar" and "/opt/spark/spark.jar" from the image 728.

In response to the container 726 being created from the image 728, as shown by 760, one class sharing file "common.jar.java7.cds" can be used from the physical volume 732, which corresponds to the archive file "/opt/apache/common.jar" in the container 726 that is originally loaded from the image 728. As loading a class sharing file from the class sharing volume pool 712 can be much quicker than loading an archive file from the image 728, the creating process of the container 726 can be accelerated.

Using the class sharing file "common.jar.java7.cds" from the physical volume 732 as shown by 760 is based on a determination that a corresponding sharing file for "/opt/apache/common.jar" in the image 728 is found in the class sharing volume pool 712. For a first archive file (e.g., /opt/apache/common.jar) in the image 728, its corresponding class sharing file can be the class sharing file (e.g., common.jar.java7.cds) generated for the same second archive file (e.g., /opt/apache/common.jar) in the image 722, which is in the same layer (e.g., d3a1f33a) with the first archive file. If a corresponding class sharing file is not found in the class sharing volume pool 712 for an archive file in an image (e.g., /opt/spark/sparkweb.jar in the image 728), the archive file is loaded from the image. By creating class sharing files for each different archive file rather than for a whole container, the class sharing files can be shared across images, and the class sharing file failure penalty can be avoided and memory footprint can be decreased.

Figure 8:
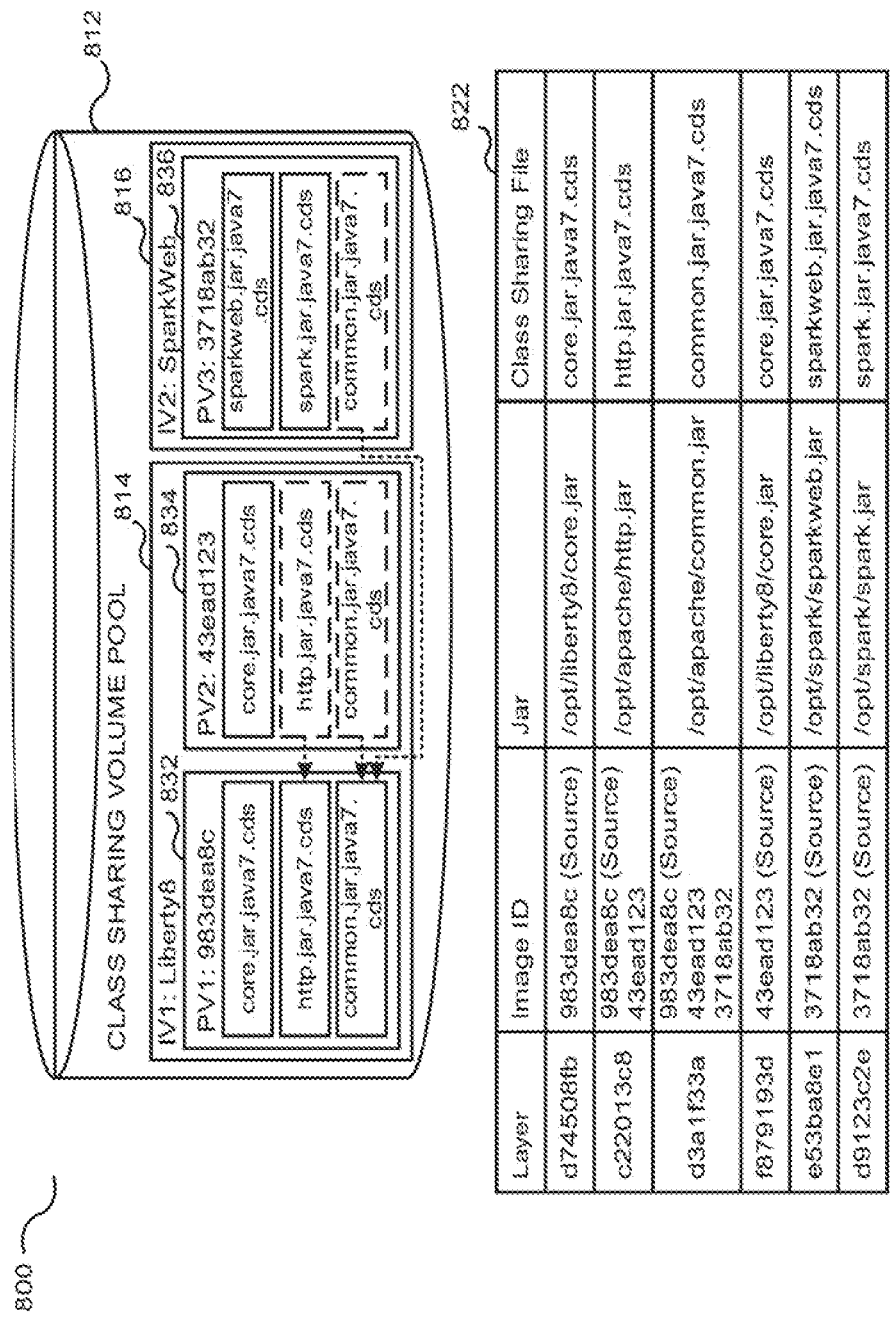
FIG. 8 shows an exemplary layer-based metadata used in accelerating class data loading in a containers environment according to an embodiment of the present invention.

FIG. 8 shows an exemplary layer-based metadata used in accelerating class data loading in a containers environment.

As shown in FIG. 8, the class sharing volume pool 812 contains class sharing files for three images. For example, the class sharing volume pool 812 in FIG. 8 can be created by executing the processes in FIGS. 5-7 sequentially. The class sharing volume pool 812 comprises one or more image volumes (e.g., IV1 and IV2), and each image volume (e.g., IV1) comprises one or more physical volumes (e.g., PV1 and PV2). Different image volumes in the class sharing volume pool 812 can be used to store class sharing files for different images. Different physical volumes in an image volume for an image can be used to store class sharing files for different versions of the image.

The class sharing files for the image 522 named "Liberty8" with a version number of 983dea8c as shown in FIG. 5 are stored in a physical volume 832 in an image volume 814, the class sharing files for the image 628 named "Liberty8" with a version number of 43ead123 as shown in FIG. 6 are stored in a physical volume 834 in the image volume 814, and the class sharing files for the image 728 named "SparkWeb" with a version number of 3718ab32 as shown in FIG. 7 are stored in a physical volume 836 in an image volume 816. Class sharing files "common.jar.java7.cds" and "http.jar.java7.cds" in the physical volumes 834 can be linked to the class sharing files "common.jar.java7.cds" and "http.jar.java7.cds" in the physical volume 832, and the class sharing files "common.jar.java7.cds" in the physical volume 836 can be linked to the class sharing file "common.jar.java7.cds" in the physical volume 832.

Layer-based metadata 822 can be maintained. The metadata can be split into read-only and read-write parts, and can be allocated in separate memory or storage regions, depending on the architecture of the container as provided by the vendor. For example, the loaded class metadata can be saved to a file, or can be saved to a directory. The read-only and read-write pages are mapped in shared memory that is accessible to the containers. The mapped read-only pages are shared among the multiple containers, and the mapped read-write pages are shared as copy-on-write. It would be appreciated that any appropriate data structure can be used to maintain the layer-based metadata 822, such as a link list, a tree or the like, in addition to the table as shown in FIG. 8. The layer-based metadata can describe at least one of the following: each archive file, class sharing file of the each archive file, images in which the each archive file is shared, layer in which the each archive file is located, and source image of the each archive file.

Referring to FIG. 8, in the metadata 822, each row corresponds to a layer and contains data describing which image(s) has the layer, which archive file is in this layer and its corresponding class sharing file. The metadata 822 can record source image for each archive file in a layer. The source image is the image from whose physical volume the archive file in the layer can be loaded. For example, the archive file /opt/apache/http.jar in the layer c22013c8 is included in the images 43ead123 and 983dea8c. As shown in FIG. 8, the image 983dea8c is marked as the source image, as the actual class sharing file "http.jar.java7.cds" is stored in the physical volume 832 for the image 983dea8c and the physical volume 834 for the image 43ead123 only contains a link to the class sharing file "http.jar.java7.cds" in the physical volume 832.

The layer-based metadata 822 can be used to determine whether a corresponding class sharing file is found in the shared location (e.g., as shown by 440, 660 and 760). The determination may be made in an iterative way. It would be appreciated that any appropriate method may be used in the determination process, such as a depth-first search method, a greedy method or the like. Utilizing the layer-based metadata 822 can facilitate management of class sharing files in the class sharing volume pool 812.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession can, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method, comprising:
   creating a container from an image, wherein the image includes at least one layer, each layer having at least one archive file, each archive file containing a class sharing file;

creating an image volume in a shared location, wherein the image volume stores an instantiated image, and wherein the image and the image volume are identified by a same unique image identifier;

before loading each layer into the image volume, searching the shared location for a class sharing file having a class sharing file identifier that matches a class sharing file identifier of the class sharing file in the image;

in response to locating a matching class file in the shared location, storing a link to the class file from the shared location in the image volume; and in response to not locating the matching class file in the shared location, loading the class sharing file from the image to the image volume as a new writable layer.

2. The method of claim 1, wherein the storing the class sharing file in the shared location comprises: storing the class sharing file as a memory-mapped file.

3. The method of claim 1, wherein the storing the class sharing file in the shared location comprises:
storing the class sharing file for the first image into one of at least one physical volume in an image volume.

4. The method of claim 3, wherein the first image and the second image are different images or different versions of the same image, and a class sharing file in a second physical volume in an image volume for the second image is linked to the corresponding class sharing file stored in a first physical volume in an image volume for the first image.

5. The method of claim 4, further comprising: determining whether the loaded class sharing file is valid in comparison to a class sharing file from an other archive, based on layer-based metadata.

6. The method of claim 5, wherein each entry in the layer-based metadata comprises: a layer identifier, an image identifier, an archive file identifier, a class sharing file identifier, and an indicator that the image identifier is a source of the identified archive file.

7. The method of claim 1, wherein the archive file in an upper layer of the image overrides a same archive file in a lower layer of the image.

8. A computer system, comprising one or more computer processors; one or more computer readable storage media; computer program instructions, the computer program instructions being stored on the one or more computer readable storage media for execution by the one or more computer processors, and causing the one or more computer processors to execute the method comprising:

creating a container from an image, wherein the image includes at least one layer, each layer having at least one archive file, each archive file containing a class sharing file;

creating an image volume in a shared location, wherein the image volume stores an instantiated image, and wherein the image and the image volume are identified by a same unique image identifier;

before loading each layer into the image volume, searching the shared location for a class sharing file having a class sharing file identifier that matches a class sharing file identifier of the class sharing file in the image;

in response to locating a matching class file in the shared location, storing a link to the class file from the shared location in the image volume; and in response to not locating the matching class file in the shared location, loading the class sharing file from the image to the image volume as a new writable layer.

9. The computer system of claim 8, wherein each of the first and second ages comprises one or more layers, the corresponding class sharing file of an archive file in the second image is a class sharing file of the same archive file in the first image and both archive files are in the same layer in respective images.

10. The computer system of claim 8, wherein the storing the class sharing file in the shared location comprises: storing the class sharing file as a memory-mapped file.

11. The computer system of claim 8, wherein the storing the class sharing file in the shared location comprises:
storing the class sharing file for the first image into one of at east one physical volume in an image volume.

12. The computer system of claim 11, wherein the first image and the second image are different images or different versions of the same image, and a class sharing file in a second physical volume in an image volume for the second image is linked to the corresponding class sharing file stored in a first physical volume in an image volume for the first image.

13. The computer system of claim 8, wherein the determining is based on a comparison of layer-based metadata of the class sharing file to the layer-based metadata of archive file, and wherein a class sharing file is generated for the archive file based on non-matching metadata.

14. A computer program product, comprising a computer readable storage medium having program instructions embodied therewith, the program instructions executable by one or more processors to cause the one or more processors to perform actions of: A computer-implemented method, comprising:

creating a container from an image, wherein the image includes at least one layer, each layer having at least one archive file, each archive the containing a class sharing file;

creating an image volume in a shared location, wherein the image volume stores an instantiated image, and wherein the image and the image volume are identified by a same unique image identifier;

before loading each layer into the image volume, searching the shared location for a class sharing file having a class sharing file identifier that matches a class sharing file identifier of the class sharing file in the image;

in response to locating a matching class the in the shared location, storing a link to the class the from the shared location in the image volume; and in response to not locating the matching class file in the shared location, loading the class sharing file from the image to the image volume as a new writable layer.

15. The computer program product of claim 14, wherein each of the first and second images comprises one or more layers, the corresponding class sharing file of an archive file in the second image is a class sharing file of the same archive file in the first image, and both archive files are in the same layer in respective images.

16. The computer program product of claim 14, wherein the storing the class sharing file in the shared location comprises: storing the class sharing file as a memory-mapped file.

17. The computer program product of claim 14, wherein the storing the class sharing file in the shared location comprises:
storing the class sharing file for the first image into one of at least one physical volume in an image volume.

18. The computer program product of claim 17, wherein the first image and the second image are different images or different versions of the same image, and a class sharing file in a second physical volume in an image volume for the second image is linked to the corresponding class sharing file stored in a first physical volume in an image volume for the first image.

19. The computer program product of claim 14, further comprising:
   determining whether the loaded class sharing file is valid in comparison to a class sharing file from an other archive, based on layer-based metadata.

20. The computer program product, of claim 19, wherein each entry in the layer-based metadata comprises: a layer identifier, an image identifier, an archive file identifier, a class sharing file identifier, and an indicator that, the image identifier is a source of the identified archive file.

* * * * *